(12) United States Patent
Hughes

(10) Patent No.: US 11,459,468 B2
(45) Date of Patent: Oct. 4, 2022

(54) CONDUCTIVE DOPED-EPOXY HYBRID SURFACING FILM

(71) Applicant: Aurora Flight Sciences Corporation, Manassas, VA (US)

(72) Inventor: C Josiah Hughes, Centreville, VA (US)

(73) Assignee: AURORA FLIGHT SCIENCES CORPORATION, Manassas, VA (US)

( * ) Notice: Subject to any disclaimer, the term of this patent is extended or adjusted under 35 U.S.C. 154(b) by 328 days.

(21) Appl. No.: 16/862,632

(22) Filed: Apr. 30, 2020

(65) Prior Publication Data

US 2021/0340385 A1 Nov. 4, 2021

(51) Int. Cl.
| | | |
|---|---|---|
| C09D 5/24 | (2006.01) | |
| C09D 7/61 | (2018.01) | |
| C09D 163/00 | (2006.01) | |
| C09D 7/40 | (2018.01) | |
| C08K 3/08 | (2006.01) | |
| B05D 3/10 | (2006.01) | |
| C08K 3/04 | (2006.01) | |
| C08K 7/00 | (2006.01) | |

(52) U.S. Cl.
CPC .............. *C09D 5/24* (2013.01); *B05D 3/108* (2013.01); *C08K 3/08* (2013.01); *C09D 7/61* (2018.01); *C09D 7/70* (2018.01); *C09D 163/00* (2013.01); *C08K 3/042* (2017.05); *C08K 7/00* (2013.01); *C08K 2003/085* (2013.01); *C08K 2003/0812* (2013.01); *C08K 2201/001* (2013.01)

(58) Field of Classification Search
CPC ............ B05D 3/108; C08K 2003/0812; C08K 2003/085; C08K 2201/001; C08K 3/042; C08K 3/08; C08K 7/00; B64D 45/02; C09D 163/00; C09D 5/24; C09D 7/61; C09D 7/70; H01B 1/22
See application file for complete search history.

(56) References Cited

U.S. PATENT DOCUMENTS

| | | | |
|---|---|---|---|
| 2011/0014356 A1* | 1/2011 | Fornes | C08G 59/58 324/72 |
| 2014/0154496 A1* | 6/2014 | Sang | B32B 15/20 156/196 |
| 2016/0368613 A1* | 12/2016 | Rives | H01L 31/048 |
| 2017/0158511 A1* | 6/2017 | Braley | B32B 5/24 |
| 2019/0112054 A1* | 4/2019 | Zhao | B64D 15/12 |
| 2020/0070998 A1* | 3/2020 | Ayyadurai | B64C 3/20 |

\* cited by examiner

*Primary Examiner* — Mark Kopec
*Assistant Examiner* — Jaison P Thomas
(74) *Attorney, Agent, or Firm* — Coats & Bennett, PLLC

(57) ABSTRACT

Conductive films comprising epoxy materials doped with graphene, and combined with a metal component to form a hybrid conductive surfacing film for use as lightning strike protection surfacing films for composite structures are disclosed, along with their methods of manufacture.

21 Claims, 8 Drawing Sheets

CONDUCTIVE DOPED-EPOXY HYBRID SURFACING FILM

TECHNOLOGICAL FIELD

The present disclosure relates generally to the field of coatings for composite materials. More specifically the present disclosure relates to the field of conductive composite material coatings.

BACKGROUND

The use of composite materials in the manufacture of various structures continues to increase. At least due to their strength versus weight ratio, composite materials offer advantages as replacement materials for denser materials such as, for example, metals, metal alloys, etc., for example, where the overall weight of a completed structure (or the weight of a component of a completed structure) is a consideration in the selection of materials used in the manufacture of such a completed structure (or in the manufacture of a component of a completed structure).

While composite materials are desirable materials for at least the aforementioned reasons, compared to metallic structures, structures made from conductive composite materials that are typically non-conductive, do not possess the ability to effectively dispel or dissipate electrical charge buildup that can develop naturally, that can occur from a lightning strike, or that can result from targeted electromagnetic frequencies directed at a composite structure such as, for example, an aircraft, etc.

Conductive elements in the form of metal fixtures have been affixed to composite structure exteriors for the purpose of affording lightning strike protection to composite structures that incorporate such conductive elements. However, at least in the case of aircraft, such metal fixtures (e.g. approved copper mesh solutions) add significant weight to an aircraft.

Accordingly, while the incorporation of conductive regions of, for example, metal mesh into aircraft exteriors can direct electrical charges (and offer a level of protection from the effects of impacting lightning strikes), the weight of the added metal mesh adds significant cost to the manufacture of the aircraft. In addition, heat build-up at the metal/composite interface during charge dissipation can result in rework of a damaged area at or near a structure surface. Further, the additional weight of added conductive metal mesh on a large structure (e.g., an aircraft) can adversely impact fuel usage, shorten aircraft operational range, increase manufacturing and operating cost, and can add to aircraft rework complexity when a level of damage from a lightning strike is incurred that leads to the need for rework.

SUMMARY

According to present aspects, a conductive coating layer including a conductive surfacing film for a composite material, and lightning protection systems including such conductive surfacing films for use on vehicles are disclosed.

According to present aspects, a lightning protection system for a vehicle is disclosed with the system including comprising a conductive coating layer, and with the conductive coating layer including a conductive doped epoxy mixture and a metal component. The conductive doped-epoxy mixture includes an amount of epoxy-based material and an amount of graphene, with the conductive epoxy-doped mixture present in the conductive coating layer in an amount equivalent to about 50 wt % of the conductive coating layer.

In another aspect, the epoxy-based material is present in the conductive coating mixture in an amount ranging from about 98 wt. % to about 99.5 wt. % of the conductive doped-epoxy mixture.

In another aspect, the graphene is present in the conductive epoxy-doped mixture in an amount ranging from about 0.5 wt. % to about 1.1 wt. % of the conductive doped epoxy mixture.

The conductive coating layer further includes a metal component, with the metal component having a specific conductivity ranging from about 1.47 $S \cdot m^2/g$ to about 13 $S \cdot m^2/g$.

In another aspect, the conductive doped epoxy mixture has a specific conductivity equivalent to about 1.47 $S \cdot m^2/g$.

In another aspect, the conductive coating layer has a smeared specific conductivity ranging from about 1.47 $S \cdot m^2/g$ to about 13 $S \cdot m^2/g$.

In another aspect, the conductive coating layer has a smeared specific conductivity of about 4.06 $S \cdot m^2/g$.

In a further aspect, the metal component comprises at least one of: aluminum and copper.

In another aspect, the metal component comprises a metallic mesh.

In another aspect, the metal component is a copper mesh.

In another aspect, the vehicle that includes the disclosed lightning protection systems includes at least one of: a manned aircraft; an unmanned aircraft; a manned spacecraft, and unmanned spacecraft; a manned rotorcraft; an unmanned rotorcraft; a manned terrestrial vehicle; an unmanned terrestrial vehicle; a manned surface waterborne vehicle; an unmanned surface waterborne vehicle; a manned sub-surface waterborne vehicle; an unmanned sub-surface waterborne vehicle; a manned hovercraft, and an unmanned hovercraft.

According to further present aspects, a vehicle is disclosed, with the vehicle including a conductive surfacing film, with the conductive surfacing film including a conductive doped-epoxy mixture, and with the conductive doped epoxy mixture including an epoxy-based material and graphene, with the graphene present in the conductive doped-epoxy mixture in an amount ranging from about 0.5 wt. % to about 1.1 wt. % of the conductive doped epoxy mixture. The conductive surfacing film further includes a metal component, with metal component having a specific conductivity ranging from about 6.5 $S \cdot m^2/g$ to about 13.0 $S \cdot m^2/g$.

In another aspect, the epoxy-based material is present in the conductive coating mixture in an amount ranging from about 98 wt. % to about 99.5 wt. % of the conductive doped-epoxy mixture.

In another aspect, the conductive epoxy-based material has a density ranging from about 1.6 to about 1.8 g/cc.

In a further aspect, conductive epoxy-based mixture is present in the conductive surfacing film in an amount equivalent to about 50 wt. % of the weight of the conductive surfacing film In another aspect, the conductive epoxy-based mixture has a conductivity of about $2.5 \times 10^5$ S/m.

In a further aspect, the conductive epoxy-based mixture has a specific conductivity of about 1.47 $S \cdot m^2/g$.

According to further aspects, a method is disclosed including the steps of doping an epoxy-based material with an amount of graphene to form a conductive doped-epoxy mixture, with the graphene present in the conductive doped-epoxy mixture in an amount ranging from about 0.5 wt. % to about 1.1 wt. % of the conductive doped-epoxy mixture, and incorporating a metal component into the conductive doped-epoxy mixture to form a conductive surfacing film mixture.

In another aspect, the method further includes curing the conductive surfacing film mixture to form a cured conductive surfacing film and applying the cured conductive surfacing film to a composite material.

In another aspect, the method includes applying the conductive surfacing film mixture to a composite material in an uncured or partially cured state, and then curing the conductive surfacing film mixture in situ to form a cured conductive surfacing film.

In another aspect, the method further includes co-curing the conductive surfacing film mixture and the composite material.

In another aspect, the cured conductive surfacing film has a resistivity value of about 1 ohm centimeter at a cured conductive surfacing film thickness of about 25 microns thick.

In a further aspect, the cured conductive surfacing film has a resistivity ranging from about 0.5 to about 0.6 ohm centimeter at a cured conductive surfacing film thickness of about 75 microns thick.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
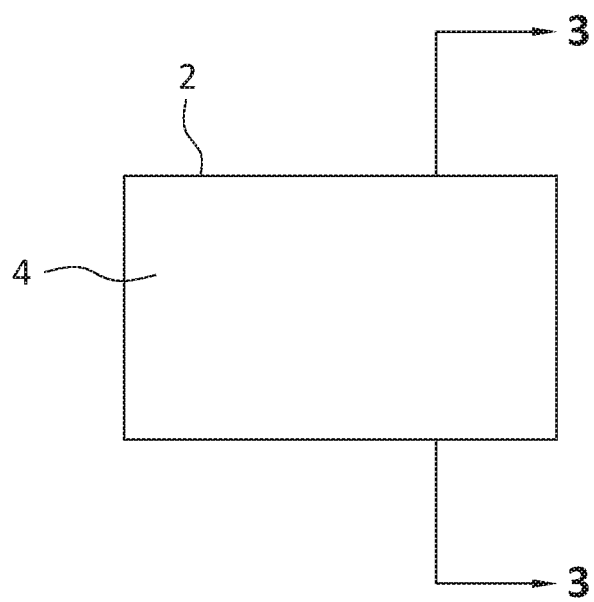
Figure 2:
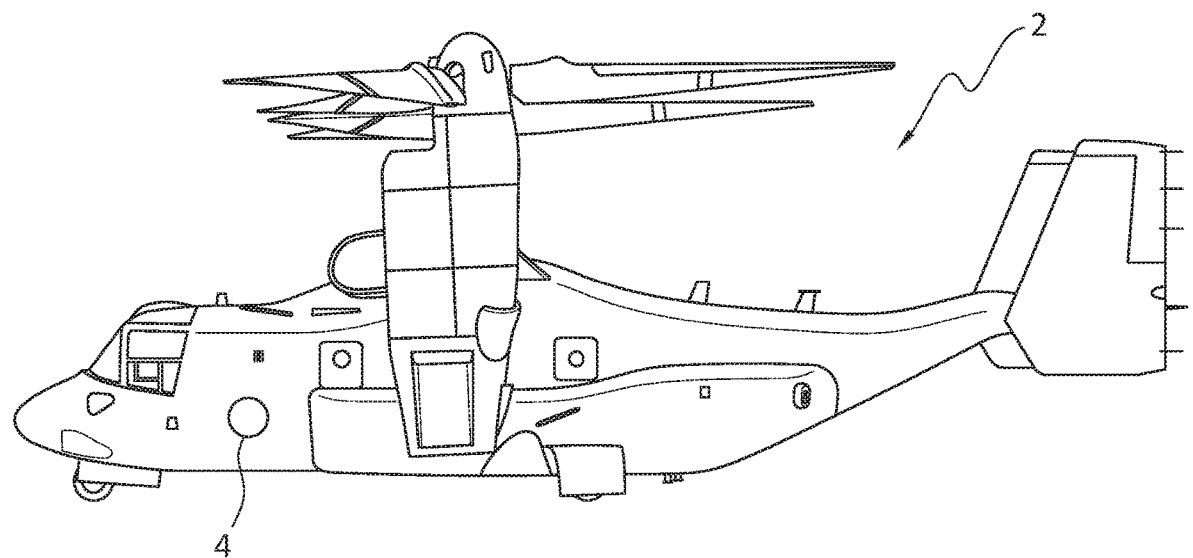
Figure 3:
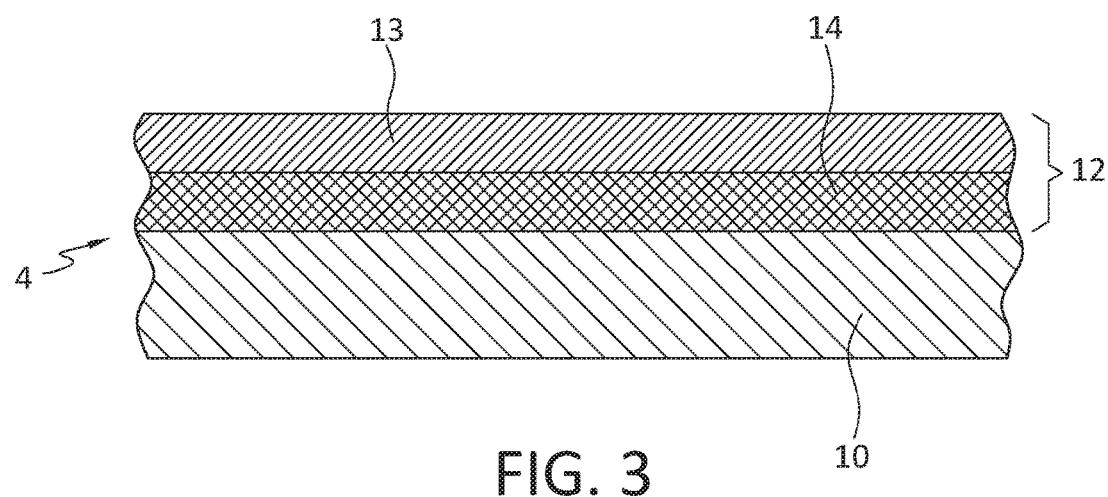
Figure 4:
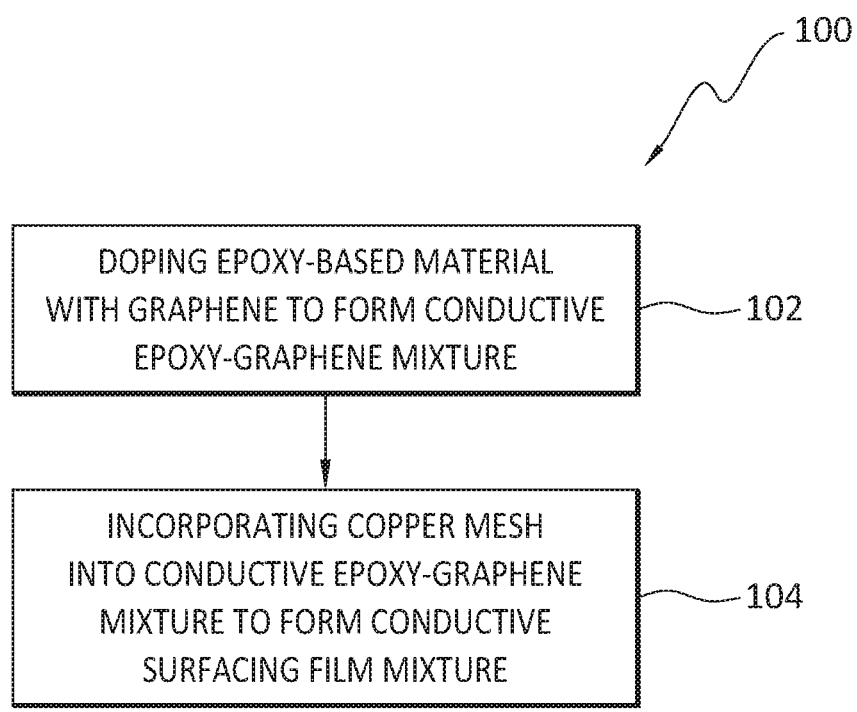
Figure 5:
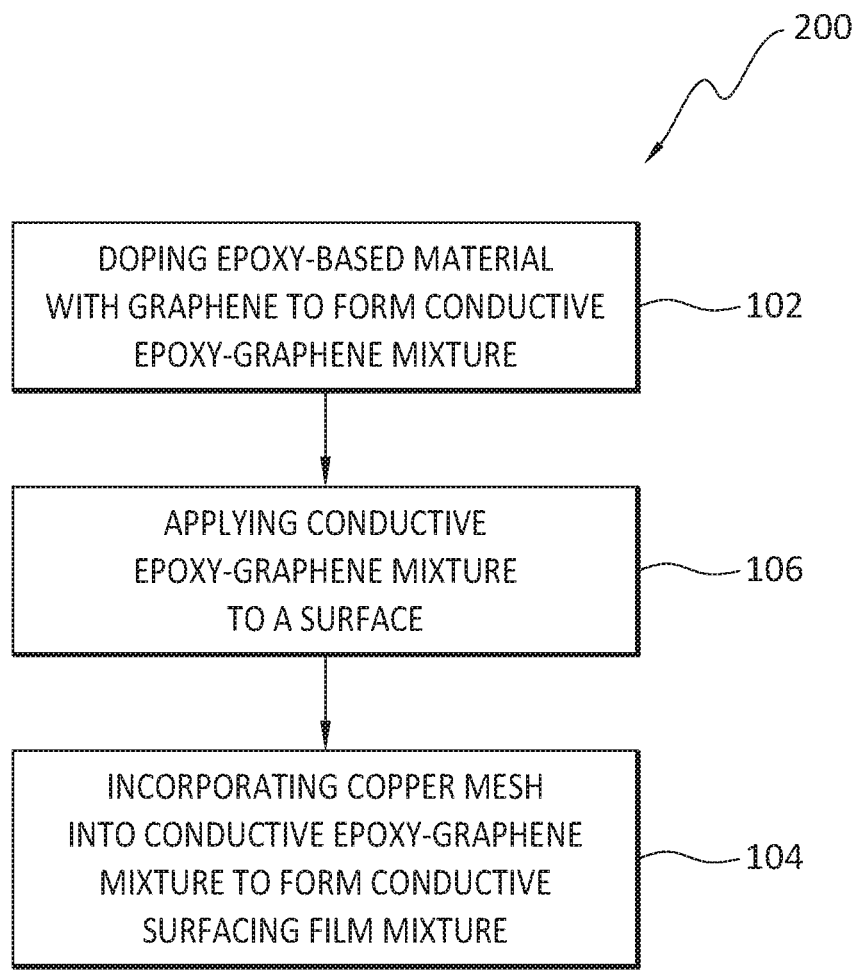
Figure 6:
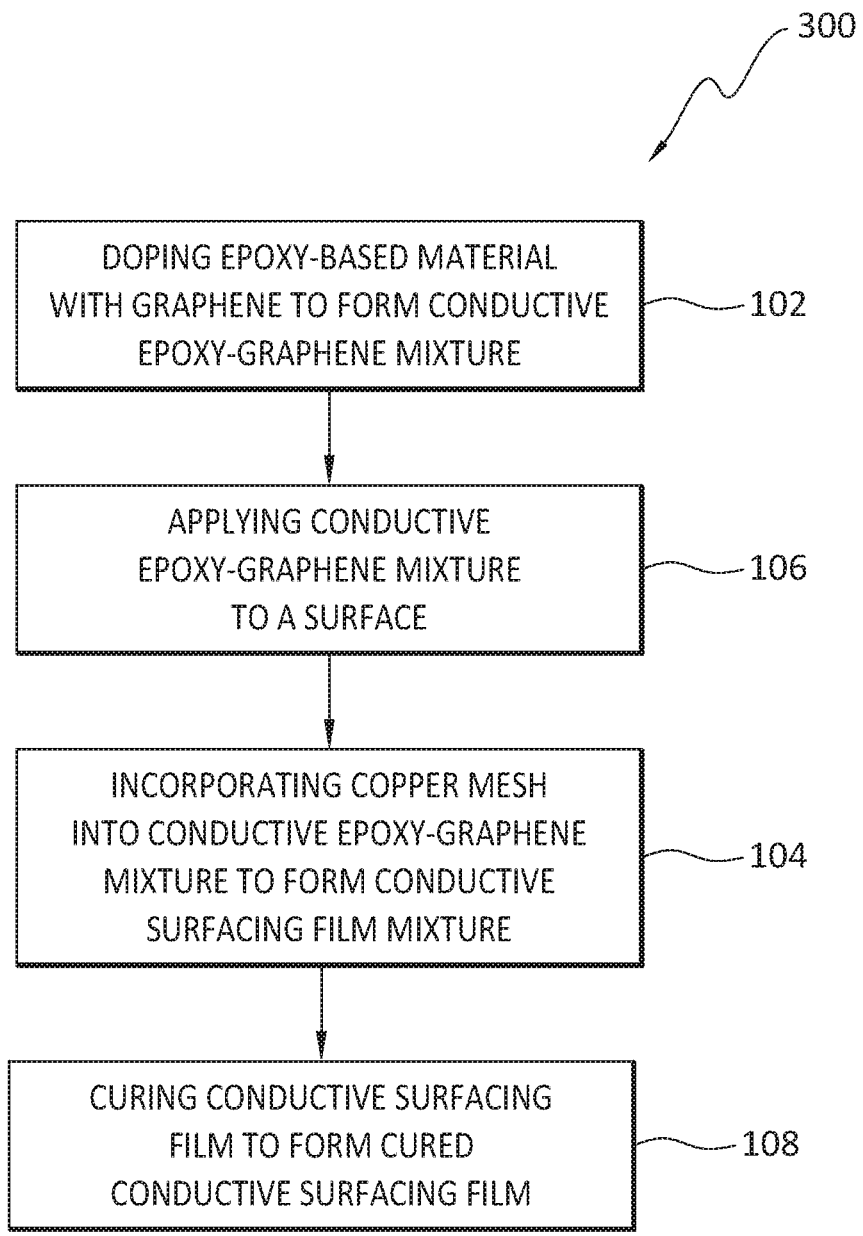
Figure 7:
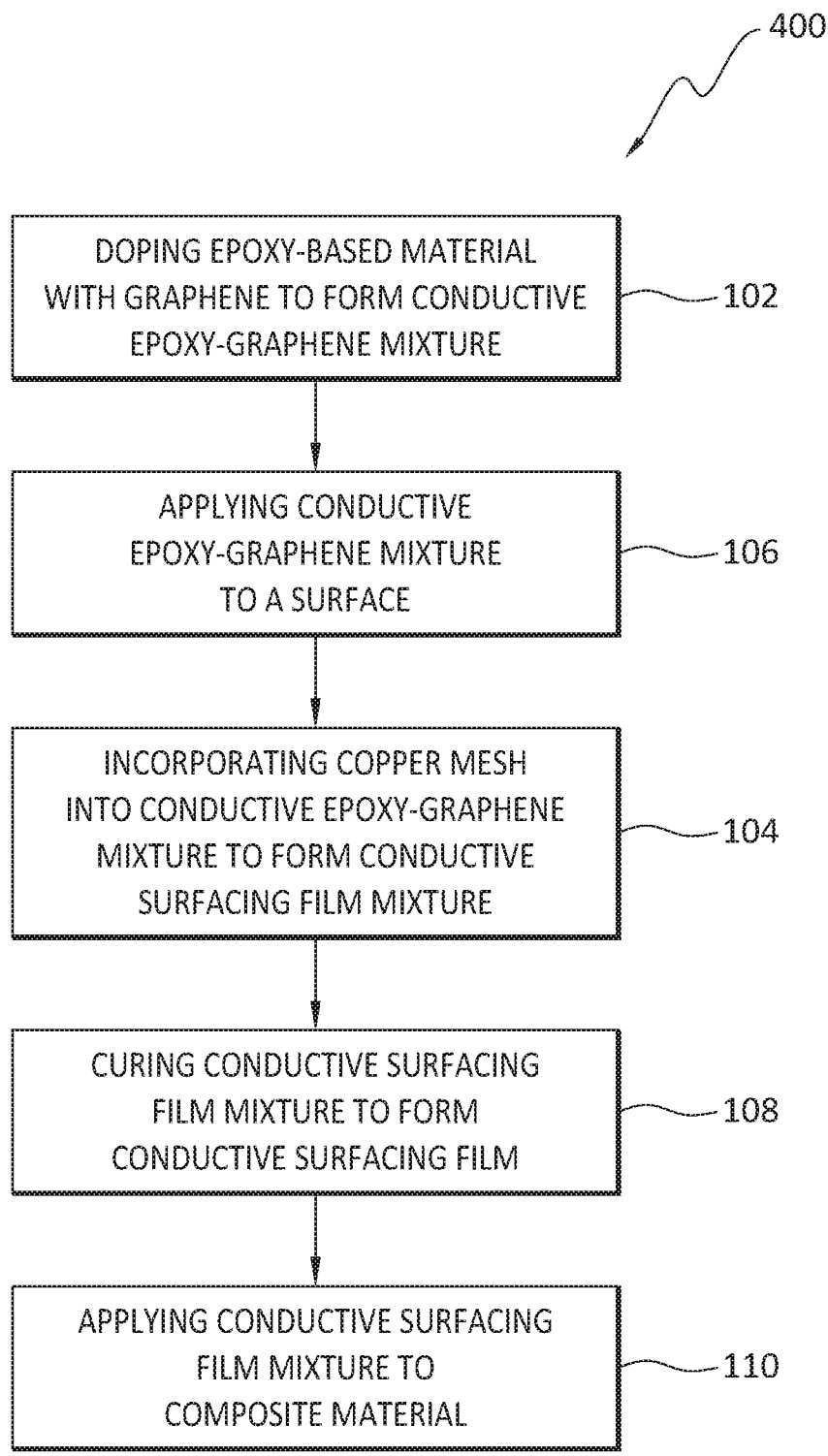
Figure 8:
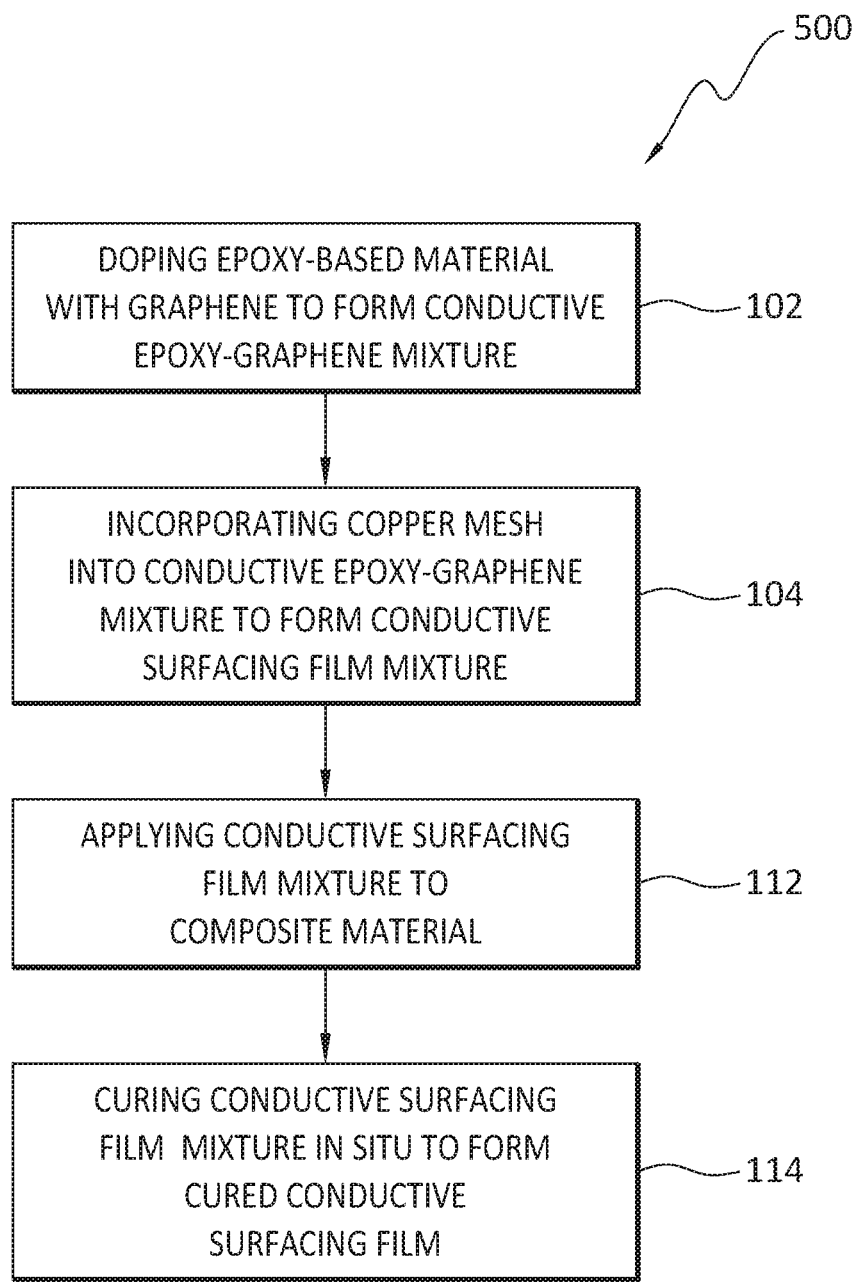

Having thus described variations of the disclosure in general terms, reference will now be made to the accompanying drawings, which are not necessarily drawn to scale, and wherein:

FIG. 1 is an illustration of a composite material surface including a conductive coating layer according to present aspects;

FIG. 2 is an illustration of a vehicle in the form of an aircraft including a conductive coating layer, according to present aspects;

FIG. 3 is a cross-sectional view of a composite material including a conductive coating layer, according to present aspects;

FIG. 4 is a flowchart outlining a method, according to present aspects;

FIG. 5 is a flowchart outlining a method, according to present aspects;

FIG. 6 is a flowchart outlining a method, according to present aspects;

FIG. 7 is a flowchart outlining a method, according to present aspects;

FIG. 8 is a flowchart outlining a method, according to present aspects; and

Figure 9:
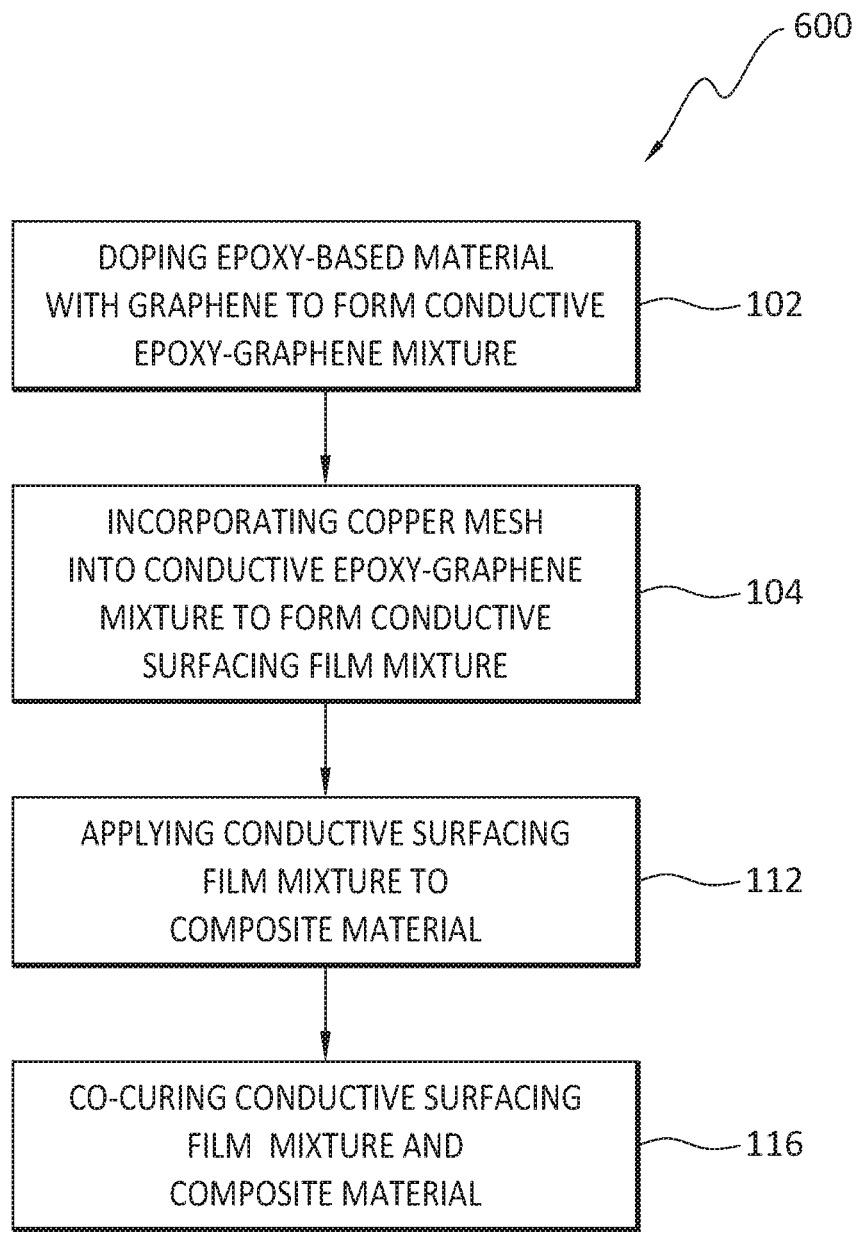

FIG. 9 is a flowchart outlining a method, according to present aspects.

DETAILED DESCRIPTION

Present aspects disclose conductive coating layers can be used on vehicles for the purpose of providing protection against lightning strikes and other sudden electrical imbalances that can impact a surface of a vehicle including, for example an aircraft. The conductive coating layers, according to present aspects, provide a superior lightweight alternative to typical lightning strike protection solutions that have, in the past, primarily involved the presence of significant amounts of conductive metal mesh placed on outer aircraft surfaces to dissipate electrical charges from aircraft, including aircraft made from non-conductive composite materials, including non-conductive epoxy resin based composite materials.

According to present aspects, a conductive surfacing film is disclosed that greatly reduces the amount of conductive metal material that needs to be attached to, for example, an aircraft made from composite materials for the purpose of dissipating electrical charges such as those impacting an aircraft's outer surface from lightning strikes, etc.

The conductive surfacing films disclosed herein include a conductive doped epoxy mixture that includes an epoxy resin-based material combined with an amount of graphene to form a conductive doped epoxy mixture that is doped with graphene. The graphene added to the epoxy resin-based material forms a conductive doped epoxy mixture, with the graphene doped epoxy mixture having a specific conductivity ranging from about 1.47 to about 13 S·m$^2$/g.

While a metal component may be needed to satisfy regulatory constraints relative to, for example, lightning strike protection, the use of the presently disclosed surfacing films that include a conductive doped epoxy having amounts of graphene can reduce the amount of conductive metals used by about 40% resulting in a significant weight reduction of an overall structure such as, for example, an aircraft.

According to present aspects, since the density of the conductive doped epoxy mixture is significantly less dense than the metal components, a significant weight reduction is realized through the use of the presently disclosed mixtures to form "hybrid" surfacing films that include significantly reduced amounts of metal components, with such "hybrid" surfacing films being significantly lightly and potentially more conductive than the conductivity of the current industry standards employing, for example significant amounts of copper mesh.

While the present aspects are not limited to the use or incorporation of a specific metal into the lightning strike protective layers disclosed herein, factors such as density, conductivity and cost have led to copper being used as an industry standard on composite material exteriors or aircraft to the electrical energy dissipation on composite aircraft surfaces from lightning strikes. Other conductive metals, such as copper, aluminum, phosphor bronze and metal-coated fiber may be employed.

According to present aspects, the metal component (e.g. copper mesh, etc., employed in the presently disclosed conductive film used as a conductive coating layer for a composite material) will carry an electrical charge and concomitant heat away from an area of incidence of electrical event such as, for example, a lightning strike. In addition, the incorporation of a conductive epoxy (formed by doping an otherwise non-conductive epoxy with graphene) into the conductive coating layer along with the metal component allows for a significant decrease in the amount of metal component used. This reduction in the amount of metal component used reduces the overall weight of the conductive coating layer. Further, the reduction in the amount of metal component used in the conductive coating layer reduces the amount of localized heat build-up in the region of the metal component (or, stated another way, increases overall heat dissipation). Such reduction in heat build-up reduces the amount of electrical insulation in the form of additional coating layers.

The reduction in the amount of the comparatively dense metal component used in the present conductive coating layers reduces the overall density and weight of the conductive coating layers, and reduces the overall weight of structures coated with the presently disclosed conductive coating layers.

By way of further explanation, typical lightning strike protective (LSP) layers are compared to the presently disclosed conductive coating layers and the presently disclosed conductive surfacing films that can be used as presently disclosed LSP layers. Copper has a density of 8.96 g/cm$^3$, a conductivity of 5.96×10$^7$ S/m, and a specific conductivity of 6.65 S·m$^2$/g. In typical LSP layers, since the epoxy component of the typical LSP layer is non-conductive, the copper is solely responsible for the conductivity of the typical LSP layer. Typical LSP layers applied to a structure, with the typical LSP layer, for example, having an overall layer density of 250 g/m$^2$ and that typically comprises a 50/50 mixture, by weight, of epoxy material would exhibit a composition of epoxy (125 g/m$^2$)/copper (125 g/m$^2$). In other words, to obtain a Smeared Specific Conductivity value of 3.33 S·m$^2$/g in a typical 50/50 epoxy/copper mesh LSP layer, the LSP would contain copper in an amount of 125 g/m$^2$.

In strong contrast to known, typical, 50/50 epoxy/copper mesh conductive LSP layers, the "hybrid" conductive LSP layers of the present disclosure, and according to present aspects, comprise 50/50 mixture by weight of a conductive coating layer of epoxy+graphene/copper that represents, in one example, an amount of epoxy+graphene (75 g/m$^2$)/copper (75 g/m$^2$) that can achieve an improved Smeared Specific Conductivity value of 4.06 S·m$^2$/g when the otherwise non-conductive epoxy material is doped with an amount of graphene. In this way, the graphene doped (and now conductive) epoxy material has a specific conductivity of 1.47 S·m$^2$/g. By reducing the amount of copper mesh from 125 g/m$^2$ (copper mesh amount in the LSP layer Industry Standard and in typical LSP layers) to 75 g/m$^2$ (copper mesh amount in the conductive LSP layer according to present aspects) the amount of copper mesh required in a conductive LSP layer is reduced by 40%. That is, present aspects disclose incorporating an amount of graphene, (e.g., "doping" the epoxy material with an amount of graphene), to obtain a predetermined specific conductivity of the epoxy+graphene mixture (referred to equivalently herein as "conductive doped epoxy mixture"). In the above example, the amount of graphene added to the epoxy material to form the 75 g/m$^2$ of epoxy+graphene is an amount of graphene equal to about 1 wt % of the epoxy+graphene mixture, with the wt % balance of the epoxy+graphene mixture being the epoxy material.

According to present aspects, the conductive graphene can be added to the non-conductive epoxy material in a predetermined amount to bestow a predetermined conductivity on the graphene-doped epoxy material, with the amount of graphene added in an amount of at least about 0.5 wt % of the conductive graphene doped-epoxy mixture. In other aspects, the conductive graphene can be added to the non-conductive epoxy material in a predetermined amount to bestow a predetermined conductivity on the graphene-doped epoxy material, with the amount of graphene added in an amount of at least about 0.5 wt % to about 1.1 wt % of the conductive graphene doped-epoxy mixture.

According to present aspects, the epoxy component is present in the conductive doped-epoxy (epoxy+graphene) mixture in an amount of at least about 90 wt % of the mixture. In further aspects the conductive doped epoxy mixture includes an epoxy-based material (e.g., the epoxy component) in an amount ranging from about 98 wt. % to about 99.5 wt. % of the conductive doped-epoxy mixture In large composite structures such as, for example, a helicopter having an exterior surface area of about 13,000 ft$^2$, the 40% reduction in copper mesh present in the conductive LSP layer according to present aspects results in a total weight savings of about 260 lbs. on the total weight of the helicopter.

In addition, the significant reduced presence of a metal component (e.g., a reduction in the amount of copper mesh, etc.) ameliorates, or otherwise lessens the potential for isolated heat build-up in the region of the metal component. That is, the reduction in the amount of a highly conductive metal in the hybrid conductive surfacing films, according to present aspects (while providing a conductive surfacing film having a higher smeared specific conductivity) can result in an increased heat dissipation from a composite surface impacted by a lightning strike. This reduction in composite material surface damage leads to an increase in operational service of large structures that incorporate the presently disclosed conductive surfacing films and lightning strike protection systems including, for example, aircraft. The increase in average operational hours before service lengthens the time between servicing, and reduces the "downtime" where, for example, an aircraft is taken out of service for rework due to lightning strike.

FIG. 1 is an illustration of an object 2 made from a composite material, with said object 2 having a surface 4, and with object surface 4 having a conductive coating layer placed upon object surface 4 (with the conductive coating layer shown in detail in FIG. 3). FIG. 2 is an illustration of object 2 shown in the form of a vehicle, with the vehicle being an aircraft type shown as a helicopter. FIG. 2 shows object surface 4 occurring at a fuselage section of object 2. According to present aspects, the conductive coating layers can be applied to any section of an object, and the object surface 4 shown as taken from an area of a fuselage is for illustration purposes only.

FIG. 3 is a cross-sectional view of the object surface shown in FIGS. 1 and 2; and taken across line 3-3 as shown in FIG. 1. As shown in FIG. 3, object surface 4 includes a composite material substrate 10 with a conductive surfacing film 12 disposed on composite material 10 such as, for example, a composite material substrate. As shown in FIG. 3, conductive surfacing film 12 includes a metal component layer 14 and a conductive graphene doped-epoxy mixture 13, with the conductive doped-epoxy mixture comprising an amount of graphene. As shown in FIG. 3, the conductive surfacing film 12 has been placed onto the composite material 10, for example, applied according to film application techniques.

The conductive surfacing film 12 comprising the conductive graphene doped-epoxy mixture 13 and the metal component layer 14 can be pre-fabricated such that the metal component layer 14 is pressed into the conductive doped-epoxy mixture 13 and rolled, for example, onto a carrier or other substrate, to form an uncured or partially cured conductive surfacing film that is then cured to form the conductive surfacing film 12. If desired, the conductive surfacing film can be stored until ready for installation (e.g., application to a composite material substrate, etc.) and use. The conductive surfacing film can be stored in an uncured, cured, or partially cured state. According to one present aspect, once cured, the conductive surfacing film 12 in a cured state is then adhered to the composite material surface in one step.

The composite material can be a fiber reinforced epoxy-based resin material such as, for example, a carbon-fiber reinforced plastic (CFRP), or other composite material. The conductive graphene doped-epoxy is formed by adding an amount of graphene to an amount of epoxy material to form the conductive graphene doped-epoxy mixture, with the conductive graphene doped-epoxy mixture comprising an amount of graphene ranging from about 0.5 wt. % to about 1.1 wt. % (the amount of graphene used to "dope" the epoxy-based material to achieve, for example, a conductive graphene doped-epoxy mixture having a specific conductivity ranging from about 1 to about 15. It is presently understood that the amount of graphene provided to the epoxy to form the conductive graphene doped-epoxy mixture is the amount of graphene necessary to provide a predetermined conductivity value to the conductive doped-epoxy mixture.

According to present aspects, the graphene can be added to the epoxy-based material in the form of a graphene ink or graphene can be added to the epoxy in the form of a graphene powder. Examples of a graphene source is Graphene One (Los Angeles, Calif.); Vorbeck Industries (Jessup, Md.), etc.

Alternately, the conductive graphene doped-epoxy mixture can be first applied to the composite material surface, for example, by a desired material application or material deposition process, followed by orienting the metal component layer into the conductive graphene doped-epoxy mixture, or the metal component layer can be first adhered to the composite substrate surface followed by impregnating the metal component layer with the conductive graphene doped-epoxy mixture to form the conductive surfacing film. In this aspect, the conductive surfacing film can then be cured in situ on the composite material. According to another aspect, after applying the conductive surfacing film in an uncured or partially cured state to a composite material that is also in an uncured or partially cured state, both the uncured or partially cured conductive surfacing film and the uncured or partially cured composite material can be co-cured.

Although illustrated in FIG. 3 as two layers (13, 14) that appear separate, when the metal component is a metallic mesh, such as, for example, a copper mesh, etc., the conductive graphene doped-epoxy mixture combines with and can infiltrate or impregnate, etc., the copper mesh such that separate layers within the conductive surfacing film 12 cannot be discerned.

According to present aspects, the thickness of the conductive surfacing films, according to present aspects, can impact the conductivity achieved by the conductive surfacing films. The presently disclosed conductive surfacing films can be applied to a composite structure (e.g., a vehicle such as, for example, a vehicle in the form of an aircraft, etc.) at a surfacing film thickness that meets or exceeds industry standards. That is, the conductive surfacing films disclosed herein can be applied to a composite material substrate to a thickness that is thinner than current industry standards, and that affords superior conductivity and superior lightning strike protection, and that results in an overall weight reduction of the total surfacing film on a composite material structure, and that results in a decreased overall weight of the composite material structure coated with the present conductive films.

By way of example, and according to present aspects, the conductive surfacing film comprising an epoxy+graphene/copper composition can have a resistivity value of about 1 ohm centimeter at a cured conductive surfacing film thickness of about 25 microns thick. By way of a further example, and according to further aspects, the conductive surfacing film comprising an epoxy+graphene/copper composition can have a resistivity ranging from about 0.5 to about 0.6 ohm centimeter at a cured conductive surfacing film thickness of about 75 microns thick.

FIG. 4 is a flowchart outlining a method according to present aspect. As shown in FIG. 4, a method 100, according to present aspects, is outlined including the steps of doping 102 an epoxy-based material with graphene to form a conductive epoxy+graphene mixture (referred to equivalently herein as "conductive graphene doped-epoxy mixture") and incorporating 104 a metal component in the form of a copper mesh into the conductive graphene doped-epoxy mixture to form a conductive surfacing film mixture. The method outlined in FIG. 4 can incorporate aspects set forth herein and shown in FIGS. 1-3.

FIG. 5 is a flowchart outlining a method according to present aspect. As shown in FIG. 5, a method 200, according to present aspects, is outlined including the steps of doping 102 an epoxy-based material with graphene to form a conductive epoxy+graphene mixture and applying 106 the conductive epoxy+graphene mixture to a surface that can be a supporting surface used to form the conductive surfacing film, or the surface can be a composite material surface to be coated with the conductive surfacing film. Method 200 further includes incorporating 104 a metal component in the form of a copper mesh into the conductive graphene doped-epoxy mixture to form a conductive surfacing film mixture. The method outlined in FIG. 5 can incorporate aspects set forth herein and shown in FIGS. 1-4.

FIG. 6 is a flowchart outlining a method according to present aspect. As shown in FIG. 6, a method 300, according to present aspects, is outlined including the steps of doping 102 an epoxy-based material with graphene to form a conductive graphene doped-epoxy mixture and applying 106 the conductive graphene doped-epoxy mixture to a surface that can be a supporting surface used to form the conductive surfacing film, or the surface can be a composite material surface (e.g., a composite material substrate surface, etc.) to be coated with the conductive surfacing film. Method 300 further includes incorporating 104 a metal component in the form of a copper mesh into the conductive epoxy+graphene mixture to form a conductive surfacing film mixture, and curing 108 the conductive surfacing film mixture to form a cured conductive surfacing film. The method outlined in FIG. 6 can incorporate aspects set forth herein and shown in FIGS. 1-5.

FIG. 7 is a flowchart outlining a method according to present aspect. As shown in FIG. 7, a method 400, according to present aspects, is outlined including the steps of doping 102 an epoxy-based material with graphene to form a conductive epoxy+graphene mixture and applying 106 the conductive graphene+epoxy mixture to a surface that can be a supporting surface used to form the conductive surfacing film. Method 400 further includes incorporating 104 a metal component in the form of a copper mesh into the conductive epoxy+graphene mixture to form a conductive surfacing film mixture, curing 108 the conductive surfacing film mixture to form a cured conductive surfacing film, and applying the cured conductive surfacing film to a composite material that can, for example, be in the form of a composite structure (e.g. a vehicle such as, for example a vehicle in the form of an aircraft, etc.). The method outlined in FIG. 7 can incorporate aspects set forth herein and shown in FIGS. 1-6.

FIG. 8 is a flowchart outlining a method according to present aspect. As shown in FIG. 8, a method 500, according to present aspects, is outlined including the steps of doping 102 an epoxy-based material with graphene to form a conductive graphene doped-epoxy mixture and incorporating 104 a metal component in the form of a copper mesh into the conductive epoxy+graphene mixture to form a conductive surfacing film mixture. The method 500 further includes applying the conductive surfacing film mixture (e.g., in an uncured state) to a composite material that can, for example, be in the form of a composite structure (e.g. a vehicle such as, for example a vehicle in the form of an aircraft, etc.). Method 500 further comprises curing 114 the conductive surfacing film mixture in situ (e.g., in position on or otherwise oriented on a composite material, etc.) to form the cured conductive surfacing film. The method outlined in FIG. 8 can incorporate aspects set forth herein and shown in FIGS. 1-7.

FIG. 9 is a flowchart outlining a method according to present aspect. As shown in FIG. 9, a method 600, according to present aspects, is outlined including the steps of doping 102 an epoxy-based material with graphene to form a conductive graphene doped-epoxy mixture and incorporating 104 a metal component in the form of a copper mesh into the conductive epoxy+graphene mixture to form a conductive surfacing film mixture. The method 600 further includes applying the conductive surfacing film mixture (e.g., in an uncured state) to a composite material that can, for example, be in the form of a composite structure (e.g. a vehicle such as, for example a vehicle in the form of an aircraft, etc.). The method 600 further includes co-curing 116 the conductive surfacing mixture and the composite material. The method outlined in FIG. 9 can incorporate aspects set forth herein and shown in FIGS. 1-8.

According to present aspects, the co-curable epoxy-based composite material can be fiber-reinforced epoxy-resin-based composite materials including, for example, carbon fiber-, boron fiber-, glass fiber-, aramid fiber-containing, etc., reinforced epoxy resin-based composite materials.

Presently disclosed composite materials that can include the present conductive graphene-doped epoxy surfacing films include those used in the manufacture of large objects including, for example, vehicles, etc., including, for example, manned and unmanned aircraft, manned and unmanned spacecraft, manned and unmanned rotorcraft, manned and unmanned hovercraft, manned and unmanned terrestrial vehicles, manned and unmanned waterborne surface vehicles, manned and unmanned waterborne sub-surface vehicles, manned and unmanned satellites, and the like, and combinations thereof.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A lightning protection system for a vehicle, said lightning protection system comprising:
a conductive coating layer, said conductive coating layer comprising:
a metal component;
a conductive doped-epoxy mixture, said conductive doped-epoxy mixture comprising:
an epoxy-based material;
graphene;
wherein said conductive doped-epoxy mixture is present in the conductive coating layer in an amount equivalent to a 50 wt % of the conductive coating layer; and
wherein the conductive doped-epoxy mixture has a specific conductivity ranging from about 1.47 S·m$^2$/g to about 13.0 S·m$^2$/g.

2. The lightning protection system of claim 1, wherein the epoxy-based material is present in the conductive doped-epoxy mixture in an amount ranging from about 98 wt % to about 99.5 wt % of the conductive doped-epoxy mixture.

3. The lightning protection system of claim 1, wherein the graphene is present in the conductive doped-epoxy mixture in an amount ranging from about 0.5 wt % to about 1.1 wt % of the conductive doped-epoxy mixture.

4. The lightning protection system of claim 1, wherein the conductive coating layer has a smeared specific conductivity of about 4.06 S·m$^2$/g.

5. The lightning protection system of claim 1, wherein the metal component comprises at least one of: aluminum and copper.

6. The lightning protection system of claim 1, wherein the metal component comprises a metallic mesh.

7. A vehicle comprising:
a conductive surfacing film, said conductive surfacing film comprising:
a conductive doped-epoxy mixture comprising:
an epoxy-based material;
graphene in an amount ranging from 0.5 wt. % to about 1.1 wt. % of the conductive doped-epoxy mixture;
a metal component, said metal component having a specific conductivity ranging from about 6.5 S·m$^2$/g to about 13.0 S·m$^2$/g; and
wherein the conductive doped-epoxy mixture has a density ranging from about 1.6 to about 1.8 g/cc.

8. The vehicle of claim 7, wherein the conductive doped-epoxy mixture is present in the conductive surfacing film in an amount equivalent to 50 wt. % of the conductive surfacing film.

9. The vehicle of claim 7, wherein the conductive surfacing film has a smeared specific conductivity of about 4.06 S·m$^2$/g.

10. The vehicle of claim 7, wherein the metal component comprises at least one of: aluminum and copper.

11. The vehicle of claim 7, wherein the metal component comprises a metallic mesh.

12. The vehicle of claim 7, wherein the conductive doped-epoxy mixture has a conductivity of about $2.5 \times 10^5$ S/m.

13. The vehicle of claim 7, wherein the conductive doped-epoxy mixture has a specific conductivity of about 1.47 S·m$^2$/g.

14. A method comprising:
doping an epoxy-based material with an amount of graphene to form a conductive doped-epoxy mixture, with the amount of graphene ranging from about 0.5 wt. % to about 1.1 wt. % of the conductive doped-epoxy mixture;
incorporating a metal component into the conductive doped-epoxy mixture to form a conductive surfacing film mixture; and
wherein the conductive doped-epoxy mixture has a density ranging from about 1.6 g/cc to about 1.8 g/cc.

15. The method of claim 14, wherein the conductive surfacing film mixture has a smeared specific conductivity of about 4.06 S·m$^2$/g.

16. The method of claim 14, further comprising:
curing the conductive surfacing film mixture in situ on the composite material to form a cured conductive surfacing film;

wherein the conductive surfacing film mixture comprises an amount of conductive doped-epoxy mixture equivalent to 50 wt. % of the conductive surfacing film mixture and an amount of copper mesh equivalent to 50 wt. % of the conductive surfacing film mixture; and wherein the cured conductive surfacing film has a resistivity value of about 1 ohm centimeter at a cured conductive surfacing film thickness of about 25 microns.

17. The method of claim 16, further comprising:
co-curing the conductive surfacing film mixture and the composite material.

18. The method of claim 14, further comprising:
applying the conductive surfacing film mixture to a composite material.

19. The method of claim 14, wherein the metal component comprises at least one of: aluminum and copper.

20. The method of claim 14, further comprising:
curing the conductive surfacing film mixture in situ on the composite material to form a cured conductive surfacing film;

wherein the conductive surfacing film mixture comprises an amount of conductive doped-epoxy mixture equivalent to 50 wt. % of the conductive surfacing film mixture and an amount of copper mesh equivalent to 50 wt. % of the conductive surfacing film mixture; and wherein the cured conductive surfacing film has a resistivity ranging from about 0.5 to about 0.6 ohm centimeter at a cured conductive surfacing film thickness of about 75 microns.

21. The method of claim 20, further comprising:
co-curing the conductive surfacing film mixture and the composite material.

* * * * *